United States Patent
Collins et al.

(10) Patent No.: US 7,987,907 B2
(45) Date of Patent: Aug. 2, 2011

(54) HYDROCARBON RECOVERY PROCESS

(75) Inventors: Ian Ralph Collins, Middlesex (GB); Gary Russell Jerauld, Houston, TX (US)

(73) Assignees: BP Exploration Operating Company Limited, Middlesex (GB); BP Corporation North America Inc., Warrenville, IL (US)

( * ) Notice: Subject to any disclaimer, the term of this patent is extended or adjusted under 35 U.S.C. 154(b) by 270 days.

(21) Appl. No.: 12/310,788

(22) PCT Filed: Sep. 5, 2007

(86) PCT No.: PCT/GB2007/003337
§ 371 (c)(1),
(2), (4) Date: Mar. 6, 2009

(87) PCT Pub. No.: WO2008/029124
PCT Pub. Date: Mar. 13, 2008

(65) Prior Publication Data
US 2010/0006283 A1    Jan. 14, 2010

Related U.S. Application Data

(60) Provisional application No. 60/843,000, filed on Sep. 8, 2006.

(51) Int. Cl.
*E21B 43/20* (2006.01)
*E21B 43/22* (2006.01)
*E21B 49/00* (2006.01)
*C09K 8/58* (2006.01)

(52) U.S. Cl. ............... 166/252.3; 166/252.1; 166/270.1; 166/275; 166/400; 507/277; 507/904; 507/936

(58) Field of Classification Search ............... 166/252.1, 166/252.3, 400
See application file for complete search history.

(56) References Cited

U.S. PATENT DOCUMENTS 3,369,602 A * 2/1968 Fallgatter et al. .......... 166/270.1
(Continued)

FOREIGN PATENT DOCUMENTS

GB    1 520 877    8/1978
(Continued)

OTHER PUBLICATIONS

International Search Report for PCT/GB2007/003337, mailed Dec. 10, 2007.
(Continued)

*Primary Examiner* — George Suchfield
(74) *Attorney, Agent, or Firm* — Nixon & Vanderhye

(57) ABSTRACT

Method for increasing the recovery of crude oil from a reservoir containing at least one porous and permeable subterranean formation wherein the formation includes sandstone rock and at least one mineral that has a negative zeta potential under the reservoir conditions and wherein crude oil and connate water are present within the pores of the formation. The method is carried out by (A) injecting into the formation a slug of an aqueous displacement fluid that displaces crude oil from the surface of the pores of the formation wherein the pore volume (PV) of the slug of the aqueous displacement fluid is at least 0.2 and less than 1 and the aqueous displacement fluid has a total dissolved solids (TDS) content in the range of 200 to 10,000 ppm and the fraction of the total multivalent cation content of the aqueous displacement fluid to the total multivalent cation content of the connate water is less than 1, and (B) subsequently injecting into the formation a drive water of higher multivalent cation content and/or higher total dissolved solids content than the aqueous displacement fluid.

25 Claims, 2 Drawing Sheets

U.S. PATENT DOCUMENTS

| | | | | |
|---|---|---|---|---|
| 3,414,053 A | * | 12/1968 | Treiber et al. | 166/270.1 |
| 3,467,190 A | * | 9/1969 | Townsend et al. | 166/252.3 |
| 3,474,864 A | * | 10/1969 | Hurd | 166/272.3 |
| 3,648,770 A | * | 3/1972 | Sydansk et al. | 166/252.3 |
| 3,688,844 A | * | 9/1972 | Roszelle | 166/270.1 |
| 3,827,499 A | * | 8/1974 | Norton et al. | 166/305.1 |
| 3,888,309 A | * | 6/1975 | Rhudy et al. | 166/400 |
| 3,927,716 A | | 12/1975 | Burdyn et al. | |
| RE29,219 E | * | 5/1977 | Flournoy et al. | 166/252.3 |
| 4,036,300 A | | 7/1977 | Holm et al. | |
| 4,122,895 A | * | 10/1978 | Sitton et al. | 166/252.3 |
| 4,250,961 A | * | 2/1981 | Morse et al. | 166/252.3 |
| 4,359,093 A | | 11/1982 | Bernard | |
| 4,723,603 A | | 2/1988 | Plummer | |

FOREIGN PATENT DOCUMENTS

| | | |
|---|---|---|
| WO | 2005/106192 | 11/2005 |

OTHER PUBLICATIONS

Written Opinion of the International Searching Authority for PCT/GB2007/003337, mailed Dec. 10, 2007.

PL McGuire et al., "Low Salinity Oil Recovery: An Exciting New EOR Opportunity for Alaska's North.Slope", Society of Petroleum Engineers, vol. 2, No. 93903, 2005, pp. 422-436. XP009092800.

SF Alkafeef et al., "Measurement of the Electrokinetic Potential at Reservoir Rock Surfaces and Avoiding the Effect of Surface Conductivity", Colloids and Surfaces A: Physicochemical and Engineering Aspects, vol. 159, 1999, pp. 263-270. XP002460406.

Guo-Qing Tang et al., "Influence of Brine Composition and Fines Migration on Crude Oil/Brine/Rock Interactions and Oil Recovery", Journal of Petroleum Science and Engineering, 24 1999, pp. 99-111.

Norman R Morrow et al., "Prospects of Improved Oil Recovery Related to Wettability and Brine Composition", Journal of Petroleum Science and Engineering, 20 (1998) pp. 267-276.

Eric P. Robertson, "Low-Salinity Waterflooding to Improve Oil Recovery—Historical Field Evidence", SPE 109965, 2007.

K Kosutic et al., "Removal of Sulfates and Other Inorganics from Potable Water by Nanofiltration Membrane of Characterized Porosity", Separation and Purification Technology 37 (2004) p. 177-185.

George G. Bernard, "Effect of Floodwater Salinity on Recovery of Oil Form Cores Containing Clays", American Institute of Mining, Metallurgical and Petroleum Engineers (1967) SPE 1725.

G Q Tang et al., "Salinity, Temperature, Oil Composition, and Oil Recovery by Waterflooding", SPE Reservoir Engineering, Nov. 1997, pp. 269-276.

Gary R. Jerauld et al., "Modeling Low-Salinity Water Flooding", SPE 102239 (1996).

C E Cooke et al., "Oil Recovery by Alkaline Waterflooding", Journal of Petroleum Technology, Dec. 1974, pp. 1365-1374.

Robert Ehrlich et al., "Interrelation of Crude Oil and Rock Properties with the Recovery of Oil by Caustic Waterflooding", Society of Petroleum Engineers Journal, No. 5830, Aug. 1977, pp. 263-269.

C E Johnson, "Status of Caustic and Emulsion Methods", Journal of Petroleum Technology, SPE 5561, Jan. 1976, pp. 86-92.

J E Smith, "How to Rate Crude Oils for Alkaline Flooding Potential: A Study Based on 239 Crude Oils", Society of Petroleum Engineers, No. 25171, pp. 211-221.

Charles M. Hudgins et al., "How Conoco Floods with Seawater", The Oil and Gas Journal—Feb. 15, 1971, pp. 71-77.

E H Mayer, Alkaline Injection for Enhanced Oil Recovery—A Status Report, Journal of Petroleum Technology, Jan. 1983, pp. 209-221.

T. Austad et al., "Seawater as IOR Fluid in Fractured Chalk", SPE 93000, Society of Petroleum Engineers Inc., Feb. 2005. pp. 1-9.

P. Zhang et al., "Waterflooding in Chalk: Relationship Between Oil Recovery, New Wettability Index, Brine Compositionand Cationic Wettability Modifier", SPE 94209, Society of Petroleum Engineers, Jun. 2005., pp. 1-7.

Preliminary Report on Patentability for PCT/GB2007/003337, mailed Dec. 10, 2007.

* cited by examiner

HYDROCARBON RECOVERY PROCESS

This application is the U.S. national phase of International Application No. PCT/GB2007/003337, filed 5 Sep. 2007, which designated the U.S. and claims priority to U.S. Application No. 60/843,000, filed 8 Sep. 2006, the entire contents of each of which are hereby incorporated by reference.

The present invention relates to a method for recovering hydrocarbons from a porous and permeable subterranean hydrocarbon-bearing formation by injecting a low salinity water into the formation.

BACKGROUND OF THE INVENTION

It has long been known that only a portion of the oil can be recovered from an oil-bearing subterranean formation as a result of the natural energy of the reservoir. So-called secondary recovery techniques are used to force more oil out of the reservoir, the simplest method of which is by direct replacement with another medium, usually water or gas.

Water-flooding is one of the most successful and extensively used secondary recovery methods. Water is injected, under pressure, into reservoir rocks via injection wells, driving the oil through the rock towards production wells. The water used in water-flooding is generally saline water from a natural source such as seawater (hereinafter "source water").

The factors that control crude oil/brine/rock interactions and their effect on wettability and oil recovery involve complex and sometimes competing mechanisms. It has been reported that oil recovery can be dependent on injection brine concentration. In particular, it has been shown in laboratory core studies by Morrow and co-workers that the use of a lower salinity injection water during water-flooding can increase oil recovery compared to the use of higher salinity water. SPE93903 describes later work with lower salinity water-flooding.

But lower salinity waters are often not available at a well site and would have to be made by reducing the total ion concentration of higher salinity water using techniques such as reverse osmosis or forward osmosis.

There is thus a problem of how to enhance recovery of oil from an oil-bearing formation using a method which is either cheaper for the same recovery or which gives better oil recovery for the same cost.

SUMMARY OF THE INVENTION

It has now been found that by manipulating the total multivalent cation concentration of a low salinity injection water and by injecting a minimum pore volume of the manipulated low salinity water into an oil-bearing formation that the residual oil saturation of the formation may be reduced in comparison to injecting the original low salinity water or a higher salinity water. In particular, it has been found that the key to better oil recovery is use of an injection water of a special lower multivalent cation content where the total dissolved solids content (TDS) of the injection water is in the range of 200 to 10,000 ppm. It has also been found that enhanced oil recovery using a low salinity water is dependent upon the nature of the formation.

Thus, the present invention provides a method for increasing the recovery of crude oil from a reservoir comprising at least one porous and permeable subterranean formation wherein the formation comprises sandstone rock and at least one mineral that has a negative zeta potential under the reservoir conditions and wherein crude oil and connate water are present within the pores of the formation, the method comprising:

injecting into the formation an aqueous displacement fluid that displaces crude oil from the surface of the pores of the formation wherein the aqueous displacement fluid has a total dissolved solids content (TDS) in the range of 200 to 10,000 ppm and the fraction of the total multivalent cation content of the aqueous displacement fluid to the total multivalent cation content of the connate water is less than 1.

In a preferred embodiment of the present invention there is provided a method for increasing the recovery of crude oil from a reservoir comprising at least one porous and permeable subterranean formation wherein (a) the formation comprises sandstone rock and at least one mineral that has a negative zeta potential under the reservoir conditions; (b) crude oil and connate water are present within the pores of the formation and the crude oil comprises components having anionic functional groups (hereinafter "anionic components") and/or components having cationic functional groups (hereinafter "cationic components"); and, (c) multivalent cations are adsorbed onto the surface of the pores of the formation from the connate water and are in equilibrium with free multivalent cations that are dissolved in the connate water and at least a portion of the adsorbed multivalent cations are associated with anionic components of the crude oil (hereinafter "oil-associated multivalent cations") and/or negatively charged functional groups on the surface of the pores of the formation are associated with cationic components of the crude oil (hereinafter "adsorbed cationic components"), the method comprising:

injecting into the formation an aqueous displacement fluid having a total dissolved solids (TDS) content in the range of 200 to 10,000 ppm and having displacement cations dissolved therein wherein the concentration of multivalent cations in the aqueous displacement fluid is less than the concentration of free multivalent cations in the connate water so that the oil-associated multivalent cations and/or the adsorbed cationic components are displaced from the surface of the pores of the formation and are replaced with displacement cations that are adsorbed from the aqueous displacement fluid thereby displacing crude oil from the surface of the pores of the formation.

Preferably, the aqueous displacement fluid is passed through the formation from an injection well to displace crude oil from the surface of the pores of the formation and the displaced crude oil is recovered from a production well spaced from said injection well. However, it is also envisaged that the present invention may be applied to a "huff and puff" process where a production well is put through a cycle of injecting the aqueous displacement fluid from the well into the formation, leaving the well to soak and then producing oil from the well.

The formation, through which the aqueous displacement fluid passes, comprises sandstone rock with which the oil is associated, whether by inclusion in pores or between grains or otherwise. The formation may also comprise other ingredients such as quartz. In addition, the formation comprises one or more minerals having a negative zeta potential under the reservoir conditions. Accordingly, the formation has a negative surface electrical charge under the reservoir conditions. "Zeta potential" is a parameter well known in the art and may be measured by standard means known to the person skilled in the art. Zeta potential is measured by forming a slurry of the mineral in an aqueous medium, passing an electric current through the slurry via electrodes and determining the direction and speed of the movement of the slurry particles. Preferably, the zeta potential of the mineral is from −0.1 to −50 mV, such as −20 to −50 mV under the reservoir conditions. By "reservoir conditions" is meant the temperature and pressure of the formation and the pH of the connate water. Typically, the temperature of the formation is in the range of 25 to 300°

C., for example, 50 to 200° C., in particular 100 to 150° C. Typically, the pressure of the formation is in the range of 100 to 1000 bar. Generally, the connate water has a pH in the range 4 to 8, in particular, in the range 5 to 7.

Typically, the formation comprises at least 0.1% of at least one mineral that has a negative zeta potential under the reservoir conditions, preferably 1 to 50%, more preferably, 1 to 30% and especially 2.5 to 20% (all contents in this specification are expressed by weight unless otherwise stated). The mineral may be a clay, in particular, clays of the smectite type (such as montmorillonite), pyrophyllite type, kaolinite type, illite type and glauconite type. Preferably, the clay is non-swelling under the conditions of recovery of crude oil from the formation. Other examples of minerals that have a negative zeta potential under reservoir conditions include transition metal compounds, such as oxides and carbonates, for example, iron oxide, siderite, and plagioclase feldspars. The amount of such mineral(s) in the formation may be determined by X-ray diffraction using ground-up formation rock. It has been found that increasing levels of incremental oil recovery correlates with increasing amounts of the mineral(s) in the formation.

Multivalent cations, preferably divalent and/or trivalent cations, are adsorbed onto the surface of the pores of the formation from the connate water. Without wishing to be bound by any theory, it is believed that the multivalent cations are chemically adsorbed onto the surface of the pores of the formation. It is also believed that the adsorbed multivalent cations are in equilibrium with multivalent cations contained in the connate water.

Examples of crude oil components having anionic functional groups ("anionic components") include hydrocarbons having carboxylate, hydroxyl, phosphonate, sulfate or sulfonate functional groups. In particular, the anionic components of the crude oil may be naphthenates.

By the anionic components of the crude oil being "associated" with the adsorbed multivalent cations is meant that the anionic components may be directly or indirectly coordinated to the adsorbed multivalent cations. The anionic components of the crude oil may be directly coordinated to the adsorbed multivalent cations via ionic bonding (termed "cation bridging") or dative bonding (termed "ligand bridging"). Alternatively, the anionic components of the crude oil may be indirectly coordinated to the adsorbed multivalent cation via hydrogen bonding through the intermediary of one or more bridging water molecules (termed "water bridging"). The direct and indirect coordination of anionic components of the crude oil to adsorbed multivalent cations is illustrated below with respect to a carboxylic acid and adsorbed divalent cations ($Ca^{2+}$ and $Mg^{2+}$):

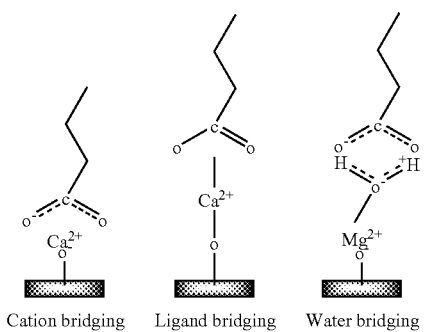

Cation bridging    Ligand bridging    Water bridging

Examples of crude oil components having cationic functional groups ("cationic components") include quaternary ammonium salts of the formula $RR_1R_2R_3N^+X^-$ where the R, $R_1$, $R_2$, and $R_3$ groups represent hydrocarbon groups and $X^-$ is an anion, for example, chloride or bromide. Generally, the cationic components of the crude oil are directly coordinated to anionic groups that are present on the surface of the pores of the formation via ionic bonding. For example, as illustrated below, there may be cation exchange between the hydrogen ions of hydroxyl groups that are present on the surface of clay minerals and quaternary ammonium ions of formula $RR_1R_2R_3N^+$.

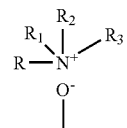

Cation exchange

The displacement cations of the aqueous displacement fluid may be multivalent cations or monovalent cations. However, monovalent cations are less efficient at displacing the adsorbed multivalent cations (and their associated anionic components of the crude oil) and/or the adsorbed cationic components of the crude oil from the surface of the pores of the formation. Accordingly, it is preferred that at least some multivalent displacement cations are present in the aqueous displacement fluid with the proviso that the total multivalent cation content of the aqueous displacement fluid is less than the total multivalent cation content of the connate water.

The fraction of the total multivalent cation content in the aqueous displacement fluid to the total multivalent cation content in the connate water (hereinafter "multivalent cation fraction") is less than 1, for example, less than 0.9. Generally, the lower the multivalent cation fraction the greater the amount of oil that is recovered from a particular formation. Thus, the multivalent cation fraction is preferably less than 0.8, more preferably, less than 0.6, yet more preferably, less than 0.5, and especially less than 0.4 or less than 0.25. The multivalent cation fraction may be at least 0.001, preferably, at least 0.01, most preferably, at least 0.05, in particular at least 0.1. Preferred ranges for the multivalent cation fraction are 0.01 to 0.9, 0.05 to 0.8, but especially 0.05 to 0.6 or 0.1 to 0.5. The fraction of the total divalent cation content of the said aqueous displacement fluid to the total divalent cation content of said connate water (hereinafter "divalent cation fraction") is also less than 1. The preferred values and ranges for the multivalent cation fraction may be applied mutatis mutandis to the divalent cation fraction.

Suitably, the monovalent displacement cations may be selected from Group I metal cations, in particular, $Na^+$. The multivalent displacement cations are preferably divalent cations or trivalent cations. Divalent cations that may be employed as displacement cations include Group II metal cations, in particular, $Ca^{2+}$ and $Mg^{2+}$ but also $Ba^{2+}$ and $Sr^{2+}$, preferably $Ca^{2+}$. Trivalent cations that may be employed as displacement cations include $Cr^{2+}$, $Cr^{3+}$, $Al^{3+}$, $V^{2+}$ or $V^{3+}$. The most effective displacement cations have a relatively high charge density over their hydrated radius (the radius of the cation and its closely bound water molecules). Accordingly, $Ca^{2+}$ is more effective as a displacement cation than $Mg^{2+}$. Mixtures of displacements cations may be employed in the displacement fluid.

The sodium content of the aqueous displacement fluid is usually 20 to 4,000 ppm, preferably, 150 to 2,500, ppm, for example, 200 to 1,000 ppm. The fraction of the sodium content to half the multivalent cation content in the aqueous displacement fluid is usually greater than 1, preferably, 1.05 to 50, most preferably 5 to 40, in particular, 5 to 20 or 20 to 40, the higher values usually being associated with higher TDS levels of the aqueous displacement fluid.

The aqueous displacement fluid usually has a calcium content of at least 1, preferably at least 5 ppm, for example, at least 10 ppm. Typically, the calcium content is in the range of 1 to 100 ppm, preferably 5 to 50 ppm. The magnesium content of the aqueous displacement fluid may be at least 1 ppm, preferably at least 5 ppm, more preferably at least 10 ppm. Typically, the magnesium content is in the range of 5 to 100, preferably 5 to 30 ppm. The barium content of the aqueous displacement fluid may be in the range of 0.1 to 20, such as 1 to 10 ppm. The weight ratio of calcium to magnesium is usually 10:1 to 1:10 especially 10:1 to 1:1 such as 10:1 to 4:1, or 5:1 to 1:6 such as 1:1 to 1:6. Thus, the calcium content may be higher than the magnesium content. Preferably, the trivalent cation content of the aqueous displacement fluid is at least 1, preferably, at least 10, for example, at least 20. Preferably, the multivalent cation content of the aqueous displacement fluid is at least 10, for example, at least 20 ppm, with the proviso that the multivalent cation fraction is less than 1. Typically, the total content of multivalent cation in the aqueous displacement fluid is 1 to 200 ppm, preferably 3 to 100, especially 5 to 50 ppm with the proviso that the multivalent cation fraction is less than 1.

The TDS content of said aqueous displacement fluid is at least 200 ppm, preferably at least 500 ppm. The TDS content may be up to 10,000 ppm, preferably, up to 8,000 ppm, more preferably, up to 7,000 ppm. In particular, the TDS may be in the range of 500 to 10,000 ppm, preferably, 1,000 to 8,000 ppm, for example, 1,000 to 5,000 ppm.

Preferably, the fraction of the multivalent cation content of the aqueous displacement fluid to the total dissolved solids (TDS) content of said aqueous displacement fluid is less than $1 \times 10^{-2}$, such as $0.01$-$0.9 \times 10^{-2}$ preferably $0.1$-$0.8 \times 10^{-2}$. These fractions may be applied mutatis mutandis to the fraction of the divalent cation content of the aqueous displacement fluid to the total dissolved solids (TDS) content of said aqueous displacement fluid.

The invention may be applied for enhanced recovery of oil from a formation where the connate water has a wide range of TDS levels, such as at least 500 ppm, usually 500 to 200,000 ppm such as 2,000 to 50,000 ppm, in particular 2,000 to 5,000 ppm or 10,000 to 50,000 ppm especially 20,000 to 45,000 ppm. The connate water is the water associated with the oil in the formation and is in equilibrium with it, especially in relation to its multivalent cation content, in particular its divalent cation (e.g. calcium) content. The calcium content of the connate water is usually at least 150 ppm, such as 200 to 30,000 ppm, 200 to 6,000 ppm and especially 200 to 1,000 ppm. The magnesium content of the connate water is usually at least 150 ppm, such as 200 to 30,000 ppm, 200 to 6,000 ppm, and especially 200 to 1,000 ppm. The total divalent cation content of the connate water is usually at least 180 ppm, such as 250 to 15,000 ppm, preferably, 350 to 3,000 ppm especially 400 to 2,000 ppm or 1,000 to 2,000 ppm. The weight ratio of calcium to magnesium in the connate water is usually 10:1 to 1:10, especially 10:1 to 1:1 such as 10:1 to 4:1 or 5:1 to 1:6, such as 1:1 to 1:6. Generally, connate water contains low levels of trivalent cations, usually less than 5 ppm.

The aqueous displacement fluid may be passed continuously into the formation. However, it is preferred that the aqueous displacement fluid is passed in one or more portions of controlled pore volume, PV, (hereinafter referred to as "slugs"). The term "pore volume" is used herein to mean the swept volume between an injection well and a production well and may be readily determined by methods known to the person skilled in the art. Such methods include modelling studies. However, the pore volume may also be determined by passing a high salinity water having a tracer contained therein through the formation from the injection well to the production well. The swept volume is the volume swept by the displacement fluid averaged over all flow paths between the injection well and production well. This may be determined with reference to the first temporal moment of the tracer distribution in the produced high salinity water, as would be well known to the person skilled in the art.

It has been found that the volume of the slug of aqueous displacement fluid may be surprisingly small yet the slug is still capable of releasing substantially all of the oil that can be displaced from the surface of the pores of the formation under the reservoir conditions. Generally, the pore volume (PV) of the slug of aqueous displacement fluid is at least 0.2 PV, as a slug of lower pore volume tends to dissipate in the formation and may not result in appreciable incremental oil production. It has also been found that where the pore volume of the aqueous displacement fluid is at least 0.3, preferably, at least 0.4, the slug tends to maintain its integrity within the formation (does not disperse within the formation) and therefore continues to sweep displaced oil towards a production well. Thus, the incremental oil recovery for a particular formation approaches a maximum value with a slug of at least 0.3 PV, preferably at least 0.4 PV, with little additional incremental oil recovery with higher pore volume slugs. Although, it is possible to continue to inject the aqueous displacement fluid into a formation, typically, the pore volume of the slug of aqueous displacement fluid is minimised since there may be limited injection capacity for the aqueous displacement fluid owing to the need to dispose of produced water. Thus, the pore volume of the aqueous displacement fluid is preferably less than 1, more preferably less than 0.9 PV, most preferably, less than 0.7 PV, in particular, less than 0.6 PV, for example, less than 0.5 PV. Typically, the slug of aqueous displacement fluid has a pore volume in the range of 0.2 to 0.9, preferably 0.3 to 0.6, and especially 0.3 to 0.45.

After injection of a pore volume of aqueous displacement fluid that achieves the maximum incremental oil recovery (preferably, a slug of aqueous displacement fluid having a pore volume of less than 1), a drive (or post-flush) water of higher multivalent cation content and/or higher TDS, usually both, may be injected into the formation. Where the slug of aqueous displacement fluid has a pore volume of less than 1, the post-flush water will ensure that the slug of aqueous displacement fluid (and hence the released oil) is swept through the formation to the production well. In addition, the injection of the post-flush water may be required to maintain the pressure in the reservoir. Typically, the post-flush water has a greater PV than the slug of aqueous displacement fluid. Preferably the post-flush water does not have a higher pH than the injected aqueous displacement fluid, and has not had alkali added to it such as sodium hydroxide, sodium carbonate, sodium silicate or sodium phosphate.

Many sources of water for the aqueous displacement fluid may potentially be used including fresh water, seawater, brackish water, aquifer water, connate water or produced water. Fresh water may be obtained from a river or lake and typically has a TDS content of less than 1500 ppm. Brackish water may be obtained from tidal or estuary river sources and typically, has a TDS content of from 5000 to 25,000 ppm. In addition, brackish water may be obtained from an aquifer which may be in a separate stratum from a stratum associated with the crude oil. However, not all aquifer water is brackish water. Thus, the TDS content for aquifer water may be in the range of 1000 to 300,000 ppm. Where connate water or production water (water that is separated from the oil that is produced from a production well) is used as the source of the water for the aqueous displacement fluid, the connate water or produced water may have a TDS content in the range of 2000 to 300,000 ppm TDS. The use of connate water or produced water as a source of the water for the aqueous displacement fluid is advantageous where there are restrictions on disposal of connate water or produced water. Seawater may also be considered for the source of the water for the aqueous displacement fluid, whether inland seas of 15,000 to 40,000 ppm such as the Caspian Sea or oceanic seas, for example, of 30,000 to 45,000 ppm TDS. If desired mixtures of waters may be used as the source of the water for the aqueous displacement fluid, for example, a low TDS aquifer water mixed with a higher salinity water such as produced water or seawater. Use of mixed waters is particularly important when a new production well is being started as, initially, there may be no or insufficient produced water to be used as the water source for the aqueous displacement fluid.

Where the TDS content of the source water and its multivalent cation content are already at the desired values for the aqueous displacement fluid to achieve incremental recovery of oil from a formation with a particular connate water, the source water may be used as aqueous displacement fluid without treatment to reduce its multivalent cation content. Examples of water that may be used as the aqueous displacement fluid without treatment include fresh water and low salinity aquifer waters. If desired, while the multivalent cation level may not be changed, the multivalent anion content e.g. content of divalent anions such as sulphate or carbonate or trivalent anions such as phosphate may be reduced e.g. by precipitation with divalent cations such as calcium, or by anion exchange (for example, using an anion exchange resin) or by nanofiltration using an anion selective membrane. If necessary, multivalent cations (in particular, divalent cations and trivalent cations) may be added to the fresh water or aquifer water to achieve the desired multivalent cation content.

Where the TDS content of the source water is already at the desired value for the aqueous displacement fluid but the multivalent cation level is higher than desired for incremental recovery of oil from a formation with a particular connate water, the source water is treated to reduce its multivalent cation level. Examples of such source waters include certain low salinity produced waters and certain low salinity aquifer waters. The treatment may be by precipitation e.g. by addition of sodium hydroxide, sodium carbonate, sodium bicarbonate, sodium phosphate or sodium silicate and separation of a precipitate comprising the multivalent cation (for example, by filtration or centrifugation) thereby producing a treated water of lower multivalent cation level for use as the aqueous displacement fluid. The treatment of the source water may also be by nanofiltration e.g. with a multivalent cation selective membrane such as Dow Filmtec NF series (in particular, NF40, NF40HF, NF50, NF70, NF90, and NF270 membranes), Hydranautics ESNA1 series, Desal-5 membrane (Desalination Systems, Escondido, Calif.), SU 600 membrane (Toray, Japan), or NRT 7450 and NTR 7250 membranes (Nitto Electric, Japan). The selective removal of multivalent cations from water of low TDS content (brackish water TDS content or less) using such membranes is discussed in U.S. Pat. No. 5,858,420 and in Separation and Purification Technology, 37 (2004), "Removal of sulfates and other inorganics from potable water by nanofiltration membranes of characterized porosity", by K Kosutic, I Novak, L Sipos and B Kunst. Alternatively, the source water may be treated by being passed through a bed of a cation exchange resin, for example, a hydrogen or sodium cation exchange resin. These treatment methods (other than cation exchange with a hydrogen cation exchange resin) have the benefit of not substantially increasing the pH of the aqueous displacement fluid compared to the untreated water. If required the treated water may also have its multivalent anion content reduced as described above.

Where the source water has a higher TDS than desired for the aqueous displacement fluid and where the multivalent cation level is also higher than desired for incremental recovery of oil from a formation with a particular connate water, the source water is treated to lower both its TDS content and its multivalent cation content to the desired values. Typically, the source water is treated to lower both its TDS and multivalent cation content to the desired values, for example, using reverse osmosis, forward osmosis or combinations thereof. Source waters that are treated in this manner include, seawater, higher salinity brackish waters, high salinity produced waters and high salinity aquifer waters. The membrane that is employed in the reverse osmosis or forward osmosis, may exclude substantially all of the dissolved solids in the source water from passing into the treated water (permeate). Suitable membranes that exclude substantially all of the dissolved solids are well known to the person skilled in the art. Accordingly, the treated water may have a TDS of as low as 200 ppm, and a divalent cation content as low as 1 to 2 ppm. Typically, the treated water will not contain any, trivalent cations. If desired, multivalent cations (divalent cations and/or trivalent cations) may be added to the treated water with the proviso that the total multivalent cation content of the treated water is less than the total multivalent cation content of the connate water. Also, if desired, salts of monovalent cations may be added to the treated water to increase its TDS content with the proviso that the TDS content does not exceed 10,000 ppm. Alternatively, the source water may be treated using a "loose" reverse osmosis membrane, as described in International Patent Application number WO 2006/002192 thereby directly forming an aqueous displacement fluid of the desired TDS content and desired multivalent cation content.

The aqueous displacement fluid may also contain water soluble polymeric viscosifiers, such as natural gums, polyacrylamides and polyacrylic acids. For avoidance of doubt, these viscosifiers are not considered to contribute to the total TDS content of the aqueous displacement fluid.

It is envisaged that a surfactant may also be added to the aqueous displacement fluid, in particular sulphonates such as alkene benzene sulphonates, whether as such or in a micellar solution with emulsified hydrocarbons.

Preferably there is no added alkali, such as sodium hydroxide, sodium carbonate, sodium bicarbonate, sodium silicate or sodium phosphate in the aqueous displacement fluid. Where any of such alkaline materials has been added to reduce the multivalent cation content of a high multivalent cation content source water, the pH of the aqueous displacement fluid should be less than 0.5 higher, preferably, less than 0.2 higher than that of the source water.

The aqueous displacement fluid contacts the formation rock, associated with which is oil, which may have an American Petroleum Institute (API) gravity of at least 15-60° preferably at least 35-45°, such as 20-30°.

In the method of the invention, the aqueous displacement fluid is preferably injected under pressure, for example, of 10,000 to 100,000 kPa (100 to 1000 bar) into at least one injection well that is spaced from a production well, and passes directly into the oil-bearing formation from the injection well. The passage of the aqueous displacement fluid forces the connate water and displaced oil ahead of it, and towards the production well from which the oil is recovered, initially with connate water and, after prolonged injection of the aqueous displacement fluid, with a mixture of connate water and aqueous displacement fluid and eventually possibly just with aqueous displacement fluid.

The method of the invention is usually used with production wells having insufficient pressure in the formation to produce significant amounts of oil (after primary recovery). These production wells may in secondary recovery (which follows primary recovery) or tertiary recovery (which follows secondary recovery). The method of the invention is thus of particular value with mature production wells.

The person skilled in the art will understand that in secondary recovery, a fluid is injected into the formation from an injection well in order to maintain the pressure in the formation and to sweep oil towards a production well. An advantage of injecting the aqueous displacement fluid into the formation during secondary recovery, is that the aqueous displacement fluid has been either formulated or selected so as to release additional oil from the surface of the pores of the formation (compared with injection of water having a higher TDS content and/or higher multivalent cation content). Accordingly, there may be a longer period of dry oil recovery from the production well thereby deferring water break-through. In addition, even after water break-through, there will be enhanced recovery of oil compared with using a water of higher TDS content and/or higher multivalent cation content.

The person skilled in the art will understand that in tertiary recovery, injection of the original fluid is stopped and a different fluid is injected into the formation for enhanced oil recovery. Thus, the fluid that is injected into the formation during tertiary recovery is the aqueous displacement fluid of selected TDS content and selected multivalent cation content, and the fluid that has previously been injected into the formation during secondary recover may be a water having a higher TDS content and/or higher multivalent cation content than the aqueous displacement fluid (for example, seawater and/or a produced water). Thus, an advantage of injecting the aqueous displacement fluid during tertiary recovery is that this results in enhanced oil recovery.

There may be one injection well and one production well, but preferably there may be more than injection well and more than one production well. There may be many different spatial relations between the or each injection well and the or each production well. Injection wells may be located around a production well. Alternatively the injection wells may be in two or more rows between each of which are located production wells. These configurations are termed "pattern flood", and the person skilled in the art will know how to operate the injection wells to achieve maximum oil recovery during the water flood treatment (secondary or tertiary recovery).

In a further preferred embodiment of the present invention there is provided a method for increasing the recovery of crude oil from a reservoir comprising at least one porous and permeable subterranean formation wherein (a) the formation comprises a sandstone rock and at least one mineral that has a negative zeta potential under the reservoir conditions, (b) crude oil and connate water are present within the pores of the formation, and (c) an aqueous displacement fluid is injected into the formation for displacing crude oil from the surface of the pores of the formation, wherein the aqueous displacement fluid is selected by:
(a) determining the multivalent cation content of the connate water; and
(b) selecting as the aqueous displacement fluid a source water having a total dissolved solids content in the range of 200 to 10,000 ppm and having a total multivalent cation content such that the fraction of the total multivalent cation content of the aqueous displacement fluid to the total multivalent cation content of said connate water is less than 1.

A sample of connate water may be obtained by taking a core from the formation and determining the multivalent cation content of the water contained within the core. Alternatively, where there has been water break-through but the reservoir remains in primary recovery, the multivalent cation content of the water that is separated from the oil may be determined.

Where no suitable source water is available for use as the aqueous displacement fluid, the TDS content and/or the total multivalent cation content of the source water may be manipulated (as described above) to give an aqueous displacement fluid of the desired TDS content and desired total multivalent cation content.

BRIEF DESCRIPTION OF THE DRAWINGS

The present invention will no be illustrated with respect to FIGS. 1 to 2 which illustrate the results set forth in Tables 1 and 2 below, and the following examples

EXAMPLES

Figure 1:
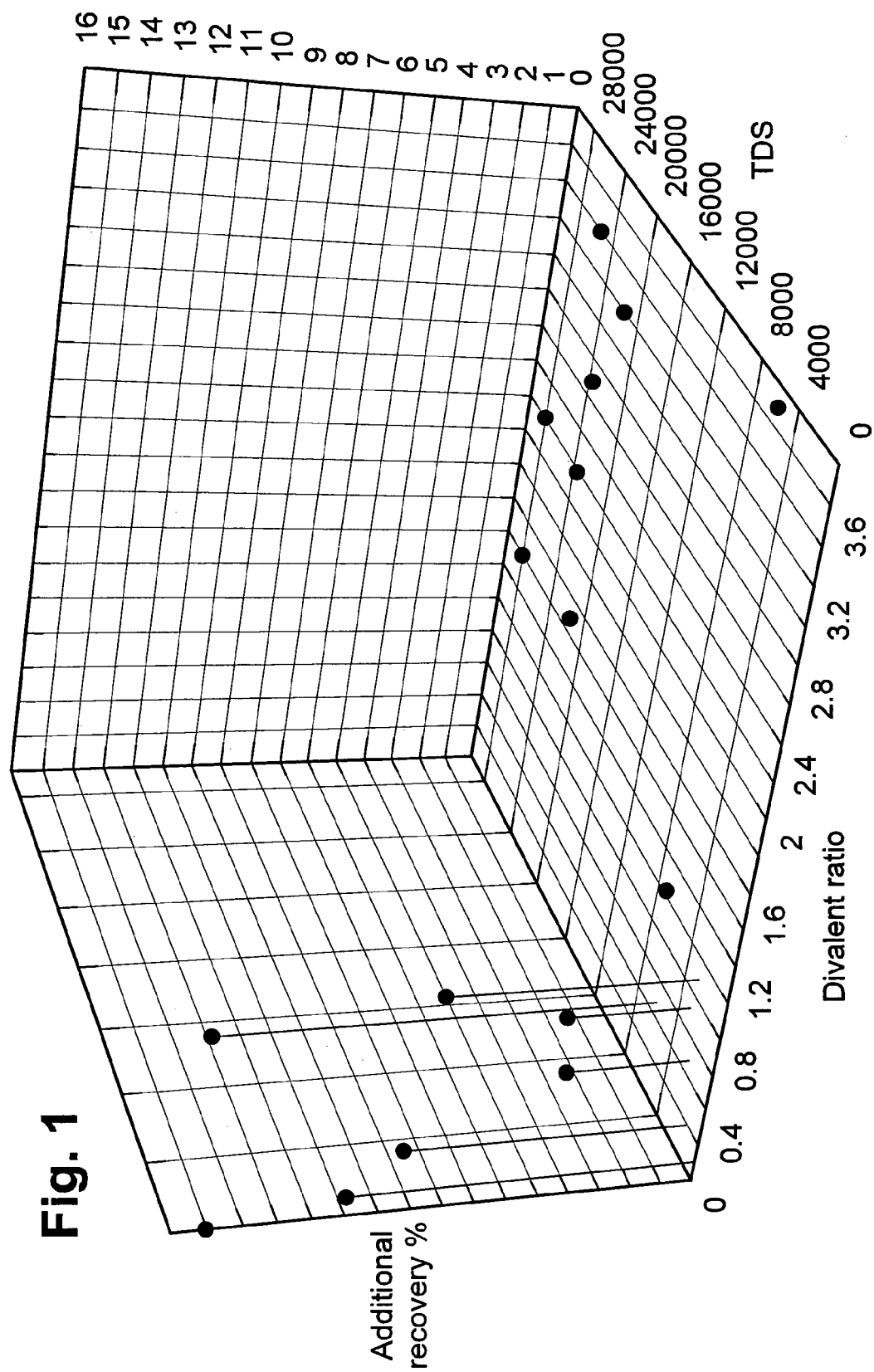

The invention is illustrated in the following Examples in which aqueous displacement fluids of varying composition are passed into oil bearing formations of varying clay content and the residual oil content of the formation when saturated with said fluids (hereinafter $S_{or}$) is measured by a Single Well Chemical Tracer Test (SWCTT).

This test has been widely used to test oil recovery processes. It involves injecting from a production well in an oil bearing formation a small volume of the aqueous displacement fluid under test which is labelled with two chemical tracers, followed by injection of the fluid without the tracers and then shutting in the well, followed by forcing the aqueous displacement fluid back to the production well under formation pressure; the liquid returned to the production well is then analysed for the tracers or hydrolysis products thereof. One of the tracers is usually an alcohol e.g. isopropanol and/or n-propanol which does not partition between the oil and water phases in the formation. The other tracer, usually an ester such as ethyl acetate (hereinafter "partitioning ester"), is hydrolysed during the shut-in to form an alcohol which does not partition between the oil and water phases. The partitioning ester returns to the production well at a slower rate than does the non-partitioning alcohol. The slower the rate and therefore the larger the separation between the return of the ester and alcohol to the production well, corresponds to a decreasing oil content of the formation and hence of the residual oil content ($S_{or}$). This technique is described in detail in SPE93903, the disclosure content of which is herein included by reference.

As discussed above, the tests were performed on a number of wells. In the case of each well the test was performed first with connate water to measure the $S_{or}$ level for connate water. The test was then repeated with the aqueous displacement fluid of varied divalent cation fraction to measure the $S_{or}$ level for that medium.

In Tables 1 and 2 are given details of the oils in a number of wells, of the analyses of the aqueous displacement fluids and connate water, the non-swelling clay content of the formation and the saturation residual oil ($S_{or}$) contents.

Well A has an oil of API 24°, from a formation containing 2.2% kaolinite and 10-20% glauconite.

Well B has an oil of API 24° from a formation containing 7.4% kaolinite.

Well C has an oil of API 27° from a formation containing kaolinite.

Well D has an oil of API 25° from a formation containing kaolinite.

Well E has an oil of API 17° from a formation containing about 3% kaolinite.

TABLE 1

| Example | Injection Medium ppm | | | | | Connate Water ppm | | | | | Divalent Fraction |
|---|---|---|---|---|---|---|---|---|---|---|---|
| | Ca | Mg | Divs | Na | TDS | Ca | Mg | Divs | Na | TDS | |
| Well A | | | | | | | | | | | |
| A | 247 | 156 | 431 | | 23423 | 96 | 32 | 161 | 9195 | 27927 | 2.7 |
| 1 | 120 | 21 | 141 | 957 | 3000 | 96 | 32 | 161 | 9195 | 27927 | 0.87 |
| Well B | | | | | | | | | | | |
| B | 194 | 360 | 561 | | 28000 | 320 | 48 | 398 | 11850 | 31705 | 1.4 |
| 2 | 17 | 55 | 73 | | 1500 | 320 | 48 | 398 | 11850 | 31705 | 0.18 |
| 3 | 30 | 6 | 36 | | 180 | 320 | 48 | 398 | 11850 | 31705 | 0.09 |
| 4 | 1.5 | 0 | 1.5 | | 10 | 320 | 48 | 398 | 11850 | 31705 | 0.003 |
| Well C | | | | | | | | | | | |
| D | 247 | 156 | 431 | | 23423 | 159 | 25 | 199 | 7860 | 21562 | 2.2 |
| 5 | 120 | 21 | 141 | | 3000 | 159 | 25 | 199 | 7860 | 21562 | 0.71 |
| Well D | | | | | | | | | | | |
| E | 247 | 156 | 431 | | 28000 | 159 | 25 | 199 | 7860 | 21562 | 2.2 |
| F | 204 | 88 | 296 | | 21434 | 159 | 25 | 199 | 7860 | 21562 | 1.5 |
| G | 159 | 42 | 205 | | 7172 | 159 | 25 | 199 | 7860 | 21562 | 1.03 |
| 6 | 77 | 11 | 96 | | 2192 | 159 | 25 | 199 | 7860 | 21562 | 0.48 |
| Well E | | | | | | | | | | | |
| H | 204 | 88 | 296 | | 21434 | 53 | 14 | 93 | 9028 | 21947 | 3.2 |
| I | 261 | 63 | 345 | 1896 | 5786 | 53 | 14 | 93 | 9028 | 21947 | 3.7 |
| 7 | 42 | 1 | 43 | 2380 | 6129 | 53 | 14 | 93 | 9028 | 21947 | 0.46 |

*Divs = Divalent cations

TABLE 2

| | | Residual Saturated Oil Level % | | |
|---|---|---|---|---|
| Example | Divalent Ratio | Connate Water | Injection medium | Difference |
| Well A | | | | |
| A | 2.7 | 21 | 21 | 0 |
| 1 | 0.87 | 21 | 13 | 8 |
| Well B | | | | |
| B | 1.4 | 43 | 43 | 0 |
| 2 | 0.18 | 43 | 34 | 9 |
| 3 | 0.09 | 41 | 30 | 11 |
| 4 | 0.003 | 42 | 27 | 15 |
| Well C | | | | |
| D | 2.2 | 19 | 19 | 0 |
| 5 | 0.71 | 19 | 15 | 4 |
| Well D | | | | |
| E | 2.2 | 21 | 21 | 0 |
| F | 1.5 | 21 | 21 | 0 |
| G | 1.03 | 21 | 21 | 0 |
| 6 | 0.48 | 21 | 17 | 4 |
| Well E | | | | |
| H | | 34 | 34 | 0 |
| I | 3.7 | 34 | 34 | 0 |
| 7 | 0.46 | 34 | 20 | 14 |

Figure 2:
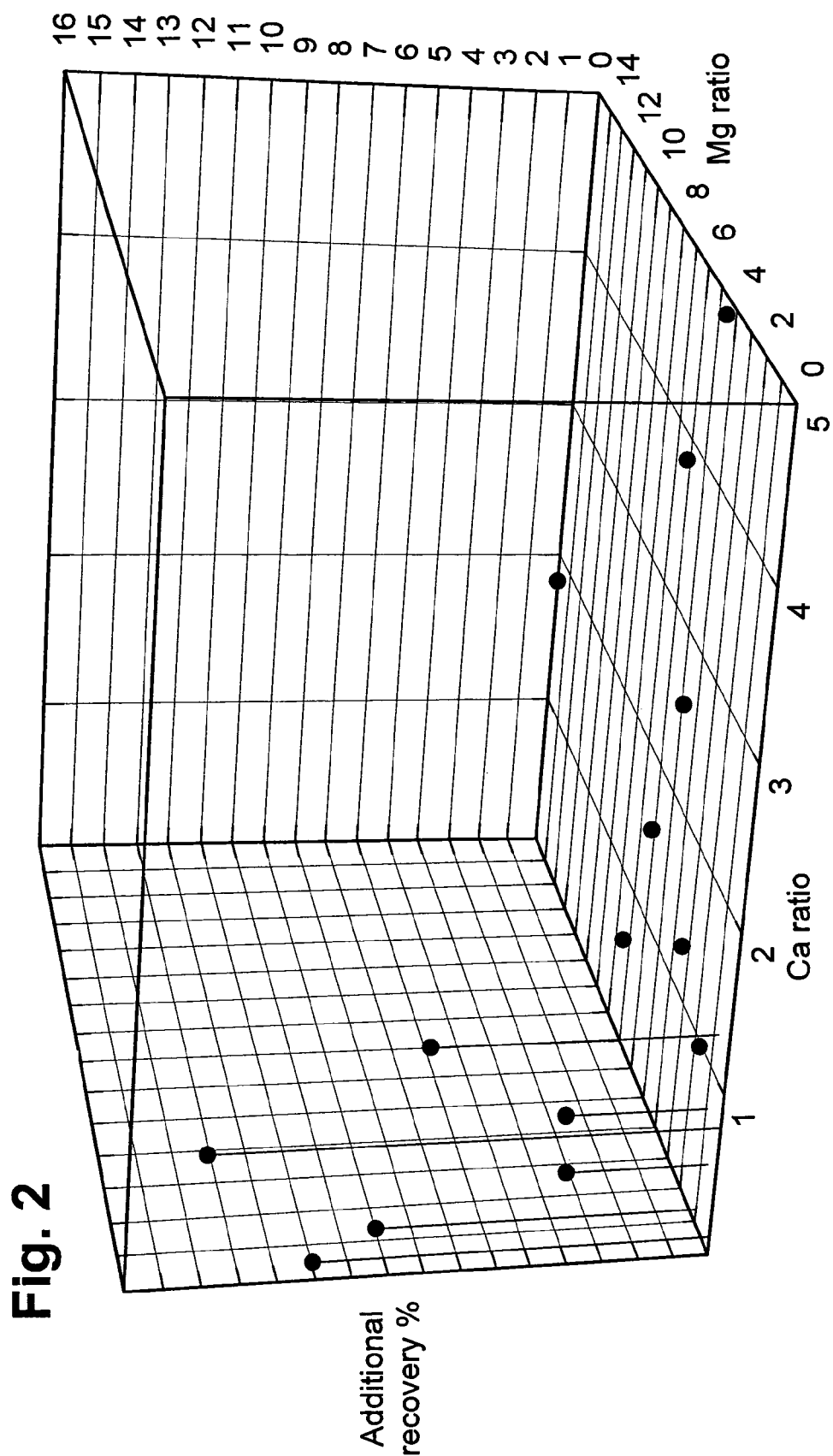

These results are shown graphically in FIGS. 1 and 2.

Example 8

The SWCTT tests of Examples 1-7 were repeated with a number of different sized slugs of the aqueous displacement fluid (injection water) of analysis Ca 1.47 ppm/Mg 0 ppm/Divalent TDS 10 ppm. The connate water contained Ca 320 ppm/Mg 48 ppm/Divalents 398 ppm/TDS 31705 ppm giving the divalent fraction of 0.003. The oil had an API gravity of 23°. The formation contained 13.8% kaolinite.

Produced water, which was the connate water in the test, was passed into the formation first, giving an $S_{or}$ of 0.42. A slug of 0.2 PV of the injection water was then passed giving an $S_{or}$ of 0.42 followed by a repeat slug of the produced water. A slug of 0.4 PV of the injection water was then passed giving an $S_{or}$ of 0.27, followed again by a slug of the produced water. The $S_{or}$ was at 0.27 after a slug of 0.7 PV of the injection water was passed again followed by produced water. The Pore Volume, PV, was determined from modelling studies.

Example 9

The SWCTT tests of Ex 8 were repeated with a number of different sized slugs of the aqueous displacement fluid (injection water) of analysis Ca 30 ppm/Mg 6 ppm/Divalent 37 ppm TDS. The connate water was the same as in Ex 8 giving the divalent fraction of 0.09. The oil had an API gravity of 23°. The formation contained 12.2% kaolinite.

Produced water, which was the connate water in the test, was passed into the formation first, giving an $S_{or}$ of 0.41. A slug of 0.2 PV of the injection water was then passed giving an $S_{or}$ of 0.37, followed by a repeat slug of the produced water. A slug of 0.3 PV of the injection water was then passed giving an $S_{or}$ of 0.30, followed again by a slug of the produced water. The Pore Volume, PV, was determined by modelling studies.

Example 10

The following studies utilized a coreflood facility which operates at reservoir conditions, of up to 150° C. and 10,000 psi. The equipment of the coreflood facility has an in-situ saturation monitor (described below) and uses live fluids (reservoir fluids that are equilibrated with reservoir gas) both for ageing and fluid flow. Volumetric production is measured at the reservoir conditions using an in-line separator. Saturations during and at the end of the flood are assured by measuring the amount of the pore space occupied by radioactively doped brine. The in-situ saturation monitor not only determines the saturation but also provides a quantitative analysis of the integrity of the slug, due to the difference in capture cross section between high salinity radioactively-doped brines and low salinity brines.

Core Preparation

Core plug samples, nominally 3" long by 1½" in diameter were used for this study. The samples were first restored i.e. the samples were cleaned using miscible solvents such that they were as close to being in a "water wet" condition as possible. After cleaning, the samples were placed in hydrostatic coreholders and were saturated with a simulated formation water (brine) by flowing the water through the core plugs under a back pressure. After a throughput of approximately 10 pore volumes of brine, the samples were removed from the hydrostatic coreholders and the initial water saturation was set up in each sample using the procedure described below.

Acquisition of Initial Water Saturation

It was essential that the core plug sample had a representative initial water saturation ($S_{wi}$) value which was matched to the water saturation at the height above the oil water contact in the reservoir. The initial water saturation for each sample was achieved by porous plate de-saturation, using the strongly non-wetting gas, nitrogen. Once the initial water saturations were acquired, the samples were loaded into hydrostatic coreholders and saturated by flowing refined oil through the samples under back pressure.

In-situ saturation monitoring was used to provide distributed saturation data to aid interpretation of experimental results. This technique was based on the linear attenuation of γ-rays using a γ-ray source and detector. Each source/detector pair viewed a slice of core having a width of 4 mm. A linear relationship exits between the log of counts (transmitted flux of γ-rays) and water saturation. Therefore, by employing careful calibration procedures for each source/detector assembly, fluid saturation could be calculated during oil/high salinity brine displacements and at the end of each low salinity slug. A number of these assemblies were mounted along the core plug samples so that water saturation was monitored at fixed positions versus time/throughput during the waterfloods.

Two sets of calibration data were collected for each source/detector pair at the end of each waterflood. 100% high salinity brine saturation calibrations were recorded at the end of the cleaning stage. 100% oil saturation calibrations were measured with the core 100% saturated with live crude oil at the end of the tests.

In these experiments it was necessary to replace chloride ions in the high salinity sea water injection brines with iodide ions so that the contrast between the aqueous and oleic phases was increased during the in-situ saturation monitoring. This reduced the noise to signal ratio, and improved the accuracy of the calculated in-situ saturations. The molarity of the doped brine was kept the same as the un-doped brine to ensure that no adverse rock/fluid interactions occurred.

Ageing Process

Samples were loaded into "reservoir condition" coreholders and slowly raised in pressure and temperature to reservoir conditions. Reservoir temperature was 130° C.

The refined oil was miscibly displaced at reservoir conditions by live crude oil to constant gas to oil ratio, via a slug of toluene. Thus, a slug of toluene is injected into the sample before injecting the crude oil. The toluene is miscible with both the refined oil and the crude oil and therefore allows the refined oil to be readily displaced by the crude oil. When the differential pressure was stable, the live crude oil viscosity and effective permeability to live crude oil was measured. The sample was then aged in live crude oil for three weeks. By live crude oil is meant dead (degassed) crude oil that has been recombined with its associated gas. During the ageing period the live crude oil was replaced every few days. A minimum of one pore volume of live crude oil was injected and a sufficient amount was used to achieve a constant pressure drop across the sample and a constant gas to oil ratio.

Waterflooding Procedures to High Salinity Remaining Oil Saturation

Unsteady state waterfloods were carried out on the samples at reservoir conditions using in-situ saturation monitoring. In-situ saturations were used to provide data on the oil distributions which developed during the course of the waterflood.

Low rate waterfloods using a brine (seawater) were carried out on restored samples at a typical reservoir advancement rate (1 foot per day, typically corresponding to 4 cm$^3$/hour in the laboratory). During the injection of the brine, oil production and pressure drop were continuously monitored. Oil production was recorded at reservoir conditions in an ultrasonic separator. This had the advantage of directly measuring oil production at reservoir conditions. The high salinity water flood was continued for a throughput of approximately 15 PV.

The brine was pre-equilibrated to the reservoir pore pressure using separator gas (i.e. gas that was separated from the crude oil at a production facility). This ensured that there was no gas transfer from the oil to the water phase that could result in oil shrinkage in the plug sample during the reservoir condition tests.

Low Salinity Water Slug Injection

The remaining oil saturation following the high salinity water flood was measured. Slugs of low salinity injection water of 0.1, 0.2, 0.3, 0.4, 0.5, 0.75 and 1 PV were injected, sequentially. The low salinity brine composition is given in Table 3 together with the composition of the connate water and the composition of the high salinity brine (seawater). All low salinity brines were pre-equilibrated with separator gas, as described previously.

TABLE 3

| | Composition of the low salinity brine | | | | | | | |
|---|---|---|---|---|---|---|---|---|
| Salt | SrCl$_2$ 6H$_2$O (mg/l) | NaHCO$_3$ (mg/l) | Na$_2$SO$_4$ (mg/l) | CaCl$_2$ 6H$_2$O (mg/l) | MgCl$_2$ 6H$_2$O (mg/l) | KCl (mg/l) | NaCl (mg/l) | NaI (mg/l) |
| Sea Water | 0 | 191 | 3,917 | 2,186 | 10,640 | 725 | 3,983 | 50,000 |
| Connate Water | 1,372 | 228 | 0 | 30,610 | 5,027 | 932 | 54,720 | 50,000 |
| Low salinity Injection Water | | 4.17 | 85.4 | 47.6 | 232 | 15.8 | 511.8 | 0 |

In-situ saturation data were used to determine the stability of the slug of low salinity injection water and the oil volume produced using each slug size.

Results and Discussion

It was found that a 0.3 pore volume slug of the low salinity injection water passes from the inlet to the outlet of the "reservoir condition" coreholder without dispersion (across a 7.5 cm plug sample). A 0.1 PV slug disperses by the time the low salinity water has reached 10% into the core plug sample. A 0.2 PV slug reaches about 30% into the core plug sample before it disperses.

The cumulative oil volumes that are produced when injecting the slugs of low salinity water are presented in Table 4. The 0.1 PV slug does not produce any incremental oil. This is as expected since the slug does not sweep any of the core plug sample. The 0.2 PV slug produces a small amount of additional oil. This additional oil is attributed to mobilization of oil in the portion of the core sample close to the inlet of the core holder. The 0.3 PV slug produces a large amount of the incremental oil, and the 0.4 PV slug produces close to 95% of the total incremental oil production.

TABLE 4

Cumulative Oil Production with Injected Low Salinity Water

| Pore volume of injected low salinity water | Cumulative oil produced, pore volumes |
| --- | --- |
| 0.1 | 0 |
| 0.2 | 0.005 |
| 0.3 | 0.044 |
| 0.4 | 0.064 |
| 0.5 | 0.064 |
| 0.6 | 0.069 |
| 0.75 | 0.069 |
| 1 | 0.073 |

The invention claimed is:

1. A method for increasing the recovery of crude oil from a reservoir comprising at least one porous and permeable subterranean formation wherein the formation comprises sandstone rock and at least one mineral that has a negative zeta potential under the reservoir conditions and wherein crude oil and connate water are present within the pores of the formation, the method comprising:
   (A) injecting into the formation a slug of an aqueous displacement fluid that displaces crude oil from the surface of the pores of the formation wherein the pore volume (PV) of the slug of the aqueous displacement fluid is at least 0.2 and less than 1 and the aqueous displacement fluid has a total dissolved solids (TDS) content in the range of 200 to 10,000 ppm and the fraction of the total multivalent cation content of the aqueous displacement fluid to the total multivalent cation content of the connate water is less than 1; and
   (B) subsequently injecting into the formation a drive water of higher multivalent cation content and/or higher total dissolved solids content than the aqueous displacement fluid.

2. A method as claimed in claim 1 wherein the pore volume of the aqueous displacement fluid is at least 0.3 PV.

3. A method as claimed in claim 2 wherein the pore volume of the aqueous displacement fluid is at least 0.4 PV.

4. A method as claimed in claim 1 wherein the pore volume of the aqueous displacement fluid is less than 0.9 PV.

5. A method as claimed in claim 4 wherein the pore volume of the aqueous displacement fluid is less than 0.8 PV.

6. A method as claimed in claim 4 wherein the pore volume of the aqueous displacement fluid is less than 0.6 PV.

7. A method as claimed in claim 4 wherein the pore volume of the aqueous displacement fluid is less than 0.5 PV.

8. A method as claimed in claim 5 wherein the aqueous displacement fluid has a pore volume in the range of 0.2 to 0.9.

9. A method as claimed in claim 8 wherein the aqueous displacement fluid has a pore volume in the range of 0.3 to 0.6.

10. A method as claimed in claim 8 wherein the aqueous displacement fluid has a pore volume in the range of 0.3 to 0.45.

11. A method as claimed in claim 1 wherein the aqueous displacement fluid is injected into the formation during secondary recovery or tertiary recovery.

12. A method as claimed in claim 1 wherein the aqueous displacement fluid is passed through the formation from an injection well to displace crude oil from the surface of the pores of the formation and the displaced crude oil is recovered from a production well spaced from said injection well.

13. A method as claimed in claim 1 wherein the aqueous displacement fluid contains water soluble polymeric viscosifiers.

14. A method as claimed in claim 1 wherein a surfactant is added to the aqueous displacement fluid.

15. A method as claimed in claim 1 wherein the drive water is selected from the group consisting of seawater and a produced water.

16. A method as claimed in claim 1 wherein the aqueous displacement fluid is selected by:
   (a) determining the multivalent cation content of the connate water; and
   (b) selecting an aqueous displacement fluid having a total dissolved solids (TDS) content in the range of 200 to 10,000 ppm and having a total multivalent cation content such that the fraction of the total multivalent cation content of the injection water to the total multivalent cation content of said connate water is less than 1, wherein the aqueous displacement fluid is (i) either an untreated water of the desired TDS content and desired total multivalent cation content or (ii) is a treated water that has been adjusted such that it has the desired TDS content and the desired total multivalent cation content.

17. A method a claimed in claim 1 wherein the zeta potential of the mineral is from −0.1 to −50 mV under the reservoir conditions.

18. A method as claimed in claim 1 wherein the mineral is present in the formation in an amount in the range of 1 to 30% by weight.

19. A method as claimed in claim 1 wherein the fraction of the total multivalent cation content of the said aqueous displacement fluid to the total multivalent cation content of the connate water is less than 0.8.

20. A method as claimed in claim 19 wherein the fraction of the total multivalent cation content of the said aqueous displacement fluid to the total multivalent cation content of the connate water is less than 0.6.

21. A method as claimed in claim 19 wherein the fraction of the total multivalent cation content of the said aqueous displacement fluid to the total multivalent cation content of the connate water is less than 0.5.

22. A method as claimed in claim 19 wherein the fraction of the total multivalent cation content of the said aqueous displacement fluid to the total multivalent cation content of the connate water is less than 0.4.

23. A method as claimed in claim 1 wherein the aqueous displacement fluid is an untreated fresh water or untreated aquifer water.

24. A method as claimed in claim 1 wherein the aqueous displacement fluid is formed by reducing the multivalent cation content of a source water wherein the source water has a TDS in the desired range of 200 to 10,000 ppm.

25. A method as claimed in claim 1 wherein the aqueous displacement fluid is formed from a high salinity source water of high multivalent cation content using reverse osmosis, forward osmosis or combinations thereof.

* * * * *

UNITED STATES PATENT AND TRADEMARK OFFICE
Certificate

Patent No. 7,987,907 B2                                                          Patented: August 2, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ian Ralph Collins, Middlexex (GB); Gary Russell Jerauld, Houston, TX (US); Arnaud Lager, Anchorage, Alaska (US); Patrick Lee McGuire, Eagle River, Alaska (US); and Kevin Webb, Worthing (GB).

Signed and Sealed this Seventh Day of February 2012.

SHANE BOMAR
*Supervisory Patent Examiner*
Art Unit 3676
Technology Center 3600